United States Patent
Haraguchi et al.

[11] Patent Number: 5,926,291
[45] Date of Patent: Jul. 20, 1999

[54] METHOD OF CALCULATING COLOR CORRECTING CONDITION AND MEDIUM FOR STORING THE METHOD

[75] Inventors: Tsuyoshi Haraguchi; Yutaka Takei, both of Hino, Japan

[73] Assignee: Konica Corporation, Tokyo, Japan

[21] Appl. No.: 08/804,064

[22] Filed: Feb. 21, 1997

[30] Foreign Application Priority Data

Feb. 29, 1996 [JP] Japan .................. 8-042730
Nov. 28, 1996 [JP] Japan .................. 8-317687

[51] Int. Cl.$^6$ .................................................. G03F 3/08
[52] U.S. Cl. .................................. 358/518; 382/167
[58] Field of Search ........................... 382/162, 167; 358/518, 520, 521, 527, 522

[56] References Cited

U.S. PATENT DOCUMENTS

| | | | |
|---|---|---|---|
| 4,154,523 | 5/1979 | Rising et al. ............................... | 355/77 |
| 4,656,505 | 4/1987 | Yamada et al. ........................... | 358/527 |
| 4,797,712 | 1/1989 | Hayashi et al. ........................... | 358/527 |
| 4,929,978 | 5/1990 | Kanamori et al. ........................ | 358/520 |
| 4,929,979 | 5/1990 | Kimoto et al. ............................ | 358/518 |
| 4,959,712 | 9/1990 | Tsuzuki et al. ........................... | 358/518 |
| 4,974,071 | 11/1990 | Terashita ................................. | 358/518 |
| 4,984,071 | 1/1991 | Yonezawa ................................ | 358/521 |
| 5,053,866 | 10/1991 | Johnson ................................... | 358/518 |
| 5,119,125 | 6/1992 | Kraft ....................................... | 355/38 |
| 5,337,130 | 8/1994 | Satoh ....................................... | 355/38 |
| 5,528,377 | 6/1996 | Hutcheson ............................... | 358/520 |
| 5,689,590 | 11/1997 | Shirasawa et al. ...................... | 382/162 |

*Primary Examiner*—Jon Chang
*Assistant Examiner*—Jingge Wu
*Attorney, Agent, or Firm*—Frishauf, Holtz, Goodman, Langer & Chick

[57] ABSTRACT

In a method of calculating a color correcting condition for a color image composed of plural pixels each separated into plural primary color density values, a statistic indicating a relationship between a primary color density value and a number of pixels showing the primary color density value is made for each primary color; a specific density value corresponding to a predetermined statistic value for each primary color from the statistic is calculated; an extracting condition for each primary color is determined based on the obtained specific density value; specific pixels are extracted from the plural pixels of the color image so as to satisfy the extracting condition; and the color correcting condition is determined based on the plural primary color density values of the extracted specific pixels.

12 Claims, 8 Drawing Sheets

METHOD OF CALCULATING COLOR CORRECTING CONDITION AND MEDIUM FOR STORING THE METHOD

BACKGROUND OF THE INVENTION

The present invention relates to a color correction conditions calculating method, a color correction method, a color correction conditions calculation apparatus, a color correction apparatus and a storing medium for correcting the color of a color original image such as an image recorded on a color light-sensitive material (a color negative film and a color reversal film) and a digital image obtained with a digital camera.

Even if printing to a photographic paper is conducted from an image recorded on a color light-sensitive material which has been subjected to photographic processing such as a color negative film or color reversal film by means of a conventional method such as a LATD control, images having poor color balance have frequently been produced depending upon the kind of light-sensitive material, photographing light source and photographic processing. In addition, even when an image is displayed on a monitor or outputted as a hard copy from a color digital image obtained by photographing a color light-sensitive material which has been subjected to photographic processing, images having poor color balance have frequently been produced depending upon the kind of light-sensitive material, photographing light source, photographic processing and image-reading device. In addition, even if an image is displayed onto a monitor image on a frame of a color negative film as it is from a color original digital image obtained through photographing by means of a digital camera or outputted as a hard copy, images having poor color balance have frequently been produced depending upon the kind of digital camera, photographing light source and a photographed scene. As described above, if a color original image is used as is, images having poor image quality are frequently produced. Therefore, an original image may be reproduced by correcting color by means of various methods. However, due to conventional color correction methods, images having poor color balance have still frequently been produced.

In addition, in order to display an image on a monitor from color original image through a digital original image or in order to output an image as a hard copy, as a method of correcting color, it is ordinary that a method of using chromaticity is known. According to this technique, a standard color chart (wherein chromaticity is selected in such a manner that a color solid can be constituted) is prepared by a coloring material of a color original image. Chromaticity such as Lab, Luv and XYZ, is measured by means of a chromaticity-meter and the prepared color chart is image-wise read by means of an image inputting device such as a digital camera or scanner for obtaining three primary color information. From the resulting chromaticity and three primary colors information, a three dimension function $F_1$ which converts the three primary information in an image inputting device to chromaticity is calculated. On the other hand, an image can be reproduced by means of a monitor or a hard copy as a color chart from conventional three primary color information selected in such a manner that the color solid can be constituted by means of a monitor or an image outputting device. The chromaticity of the color chart reproduced can be measured by means of a chromaticity-meter so that a three dimensional function $F_2$ wherein the resulting three primary color information is converted to the three primary color information of the image outputting in view of chromaticity was measured. By storing aforesaid functions, converting digital inputting images obtained by image-reading actual color original images with an image inputting device into the chromaticity by means of function $F_1$ and by subsequently converting the chromaticity to a digitally outputted image by means of the stored function $F_2$, color is corrected, displayed on a monitor or outputted as a hard copy.

However, according to the above-mentioned technology, it was difficult to prepare a standard color chart by means of a coloring material of the color original image and the form of the color solid of the three primary color information and that of the color solid of the chromaticity such as the Lab, Luv and XYZ are remarkably different. Therefore, the three dimensional function $F_1$ and the three dimensional function $F_2$ are subjected to approximate operation processing with the result that errors tend to occur. Accordingly, images cannot be converted accurately. Specifically, due to aforesaid approximate operation processing, there was a problem in neutrally reproducing poor color pixels. Specifically, when a color original image is a color negative film the colors of the color mask are mixed when a negative film is reversed to be a positive image. Therefore, it is impossible to reverse the negative film to a positive image satisfactorily. Accordingly, aforesaid method is limited only to cases when a color original image is a positive image.

In addition, various methods in which the exposure amount for printing an original image recorded on a color negative film onto a light-sensitive material for printing is determined from a digital image obtained through image-reading a color original image with a scanner have been known. For example, Japanese Patent Publication Open to Public Inspection (hereinafter, referred to as Japanese Patent O.P.I. Publication) No. 46741/1980 discloses a method of correcting color from color original image based on a multiple regression equation calculated from each statistic of the density value difference between the B-G primary colors and the density value difference between the R-G primary colors each of which is statistic of neutral color density compared to the density value of each primary color of the original pixels.

However, the invention described in Japanese Patent O.P.I. Publication No. 46741/1980 calculates statistics of density value difference between B-G primary colors and R-G primary colors on neutral density value from the density value of each primary color of the original pixels initially. Therefore, the statistics are influenced by high saturation pixels. Even if the resulting multiple regression equation is used, there is a problem that favorable color balance correction can not be conducted. In addition, even though the high saturation pixels are attempted to be removed using aforesaid multiple regression equation, if the ratio of the high saturation pixels in the image on a frame of a color negative film is great, aforesaid high saturation pixels and the influence thereof cannot be removed.

In addition, Japanese Patent O.P.I. Publication No. 220760/1984 compares the saturation based on the difference of density value with the density value of a portion where the density value is the lowest in a film strip in pixels measured with a value set in advance. Aforesaid invention describes that, if the degree of saturation is less than a value set in advance, it is extracted as a neutral pixel, and that neutral pixels are extracted based on a value set in advance.

However, the invention described in Japanese Patent O.P.I. Publication No. 220760/1984 is based on the premise that the lowest-density value portion in the film strip is neutral. Therefore, if an object image portion having high saturation is the lowest-density value portion, this is selected so that an object image portion having high saturation becomes the standard of neutral. For example, in the case of a color original image photographed in a forest, the lowest density value portion is influenced by the dense green leaf image portion. Accordingly, an object image portion having high saturation is influenced so as to be a neutral standard and favorable color correction is interfered with.

In order to prevent the above-mentioned problems, it is possible to sense whether the lowest-density value portion in the film strip is located in a range set in advance, and only when it is within the range set in advance, aforesaid film can be used. However, in such cases, a low density value and high saturation pixels may be overly included. As a result, favorable color correction may be interfered with.

Incidentally, the inventions disclosed in Japanese Patent O.P.I. Publication Nos. 220780/1984 and 46741/1980 relate to photographic printing. These publications, however, do not disclose methods to correct the color from color original digital images.

SUMMARY OF THE INVENTION

An object of the present invention is to calculate color correction conditions based on information about extracted neutral pixels and thereby to correct colors for favorable color balance due to appropriately extracted neutral pixels in an object, wherein it is not necessary to prepare numerous standard color charts or conduct two kinds of three dimensional function operation processing.

A second object is to enable effective color correction even if color correction conditions for neutrally correcting the color of pixels whose colors should be corrected neutrally in a color original digital image are different for each of neutral color density value. That is, it is a second object to calculate aforesaid color correction conditions which are different depending upon neutral color density value and to correct colors for favorable color balance from high through low density value areas;

[Explanation of Method 1]

Due to "A color correction conditions calculation method which calculates color correction conditions for correcting the color of color original images from aforesaid color original image", wherein statistics of individuality number on density value for plural different colors is calculated from each of primary color density values of the pixels of color original images; density value of each color corresponding to a prescribed statistical value is determined based on the statistics of each color calculated;

extraction conditions for extracting specific pixels from the above-mentioned pixels of color original image based on density values of each color determined are introduced for each color; specific pixels which satisfy all extraction conditions of each color introduced are extracted from color original image; and the above-mentioned color correction conditions are calculated based on each primary density value of specific pixels extracted", extraction conditions in which neutral pixels are extracted from the statistics of individuality number on density value on plural of different colors are respectively introduced and specific pixels which satisfy all extraction conditions introduced are extracted from a color original image, not extracting specific pixels based on values set in advance. Therefore, the expected value to extract pixels to be neutrally extracted is higher compared with extraction of specific pixels based on a value set in advance, and an expected value to erroneously extracting pixels of an object image having high saturation is low. In addition, the color correction conditions are calculated based on the density value of each primary color of specific pixels extracted, the color correction conditions can be obtained not substantially receiving influence by the pixels with high saturation. Accordingly, if the color of a color original image is corrected by the use of the color correction conditions calculated by the color correction conditions calculation method of the present method, an expected value in which the color of pixels to be reproduced neutrally is corrected neutrally is so high that the color can be corrected favorably.

[Explanation of Method 2]

Due to "The color correction conditions calculation methods described in Method 1 wherein the above-mentioned extraction conditions extract specific pixels from pixels of low variable density region or high density value region", the pixels of low variable density region or high density value region include much pixels to be neutrally reproduced of an object with low saturation. Therefore, an expected value to extract pixels to be reproduced neutrally of the object image with low saturation is further higher, and an expected value to erroneously extract high saturation pixels of the object image with high saturation is further low. Therefore, based on specific pixels extracted, appropriate color correction conditions can be obtained not substantially receiving influence by the pixels with high saturation. Accordingly, if the color of a color original image is corrected by the use of the color correction conditions calculated by the color correction conditions calculation method of the present method, an expected value in which the color of pixels to be reproduced neutrally is corrected neutrally is so high that the color can be corrected favorably.

[Explanation of Method 3]

Due to "A color correction conditions calculation method which calculates color correction conditions for correcting the color of color original image from aforesaid color original image, wherein statistics of individuality number on density values for plural different colors is calculated from each of the primary color density values of the pixels of the color original image;

density values of each color corresponding to plural prescribed statistic values are determined based on the statistics of each color calculated;

the extraction conditions for extracting specific pixels from the above-mentioned pixels of color original image based on the density value of each color determined are introduced for each of the above-mentioned plural statistical values and for each color;

specific pixels which satisfy all extraction conditions of each color introduced are extracted from color original image for each of the above-mentioned plural statistical values; and the above-mentioned color correction conditions are calculated for each of the above-mentioned plural statistical values based on each primary density value of specific pixels extracted", the density value of each color corresponding to plural prescribed statistical values is determined based on the statistics of individuality number on density values on plural of different colors not extracting specific pixels based on values set in advance. Extraction conditions for extracting specific pixels from the density value of each color determined for each of the prescribed plural statistical values and for each color and specific pixels which satisfy all extraction conditions of each color introduced are extracted from original image for each of the above-mentioned plural statistic values. Therefore, the expected value to extract pixels to be neutrally extracted is higher compared with extracting specific pixels based on a value set in advance, and an expected values of erroneously extracted pixels of an object image having high saturation is low. In addition, the above-mentioned color correction conditions are calculated for each of the above-mentioned plural statistical values based on each primary density value of specific pixels extracted. Accordingly, further appropriate color correction conditions can be calculated without receiving the influence by the pixels with high saturation, even if the color correction conditions which neutrally correct the color of pixels to be reproduced neutrally depending upon the density value of neutral colors (the neutral axis changes depending upon the density value of neutral color. Accordingly, if the color of a color original image is corrected by the use of the color correction conditions calculated by the present color correction conditions calculation method, the expected value in which the color of pixels to be reproduced neutrally is corrected neutrally is so high that the color can be corrected favorably.

[Explanation of Method 4]

Due to "The color correction conditions calculation method described in Method 3, wherein at least one of the plural of the above-mentioned extraction conditions is to extract specific pixels from low variable density regions and at least one of plural of the above-mentioned extraction conditions is to extract specific pixels from the high variable density regions", the pixels of low variable density region or high density value regions include numerous pixels to be neutrally reproduced of an object with low saturation. Therefore, the expected value to extract pixels to be reproduced neutrally of the object image with low saturation is further higher, and the expected value to erroneously extract high saturation pixels of the object image with high saturation is further lowered. Therefore, based on specific pixels extracted, appropriate color correction conditions can be obtained not substantially receiving influence by the pixels with high saturation. Accordingly, if the color of a color original image is corrected by the use of the color correction conditions calculated by the color correction conditions calculation method of the present method, an expected value in which the color of pixels to be reproduced neutrally is corrected neutrally is so high that the color can be corrected favorably.

[Explanation of Method 5]

Due to "the color correction conditions calculation method described in any of Methods 1 through 4, wherein the second extraction conditions in which the second specific pixels are extracted from the pixels of the above-mentioned color original image again based on each of the above-mentioned primary density value of pixels extracted;

the second specific pixels which satisfy the second extraction conditions introduced are extracted; and the above-mentioned color correction conditions are calculated based on the second specific pixels extracted", the second specific pixels are extracted based on the density value of each primary color of pixels extracted. Therefore, numerous pixels to be reproduced neutrally of the density value of each primary color can be obtained from a wide region. Accordingly, the expected value to extract pixels to be reproduced neutrally of the object image with low saturation is further higher, and the expected value to erroneously extract high saturation pixels of the object image with high saturation is further lowered. Therefore, based on the second specific pixels extracted, the color correction conditions can be obtained not substantially receiving influence by the pixels with high saturation. Accordingly, if the color of a color original image is corrected by the use of the color correction conditions calculated by the present color correction conditions calculation method, the expected value in which the color of pixels to be reproduced neutrally is corrected neutrally is so high that the color can be corrected favorably.

[Explanation of Method 6]

Due to "The color correction conditions calculation method described in any of Methods 1 through 5, wherein the above-mentioned statistics is a cumulative density function of the primary colors density value for each of the primary colors", favorable color correction conditions can be calculated with a simple operation.

[Explanation of Method 7]

"The color correction conditions method described in any of Methods 1 through 6, wherein the above-mentioned specific pixels are neutral pixels".

[Explanation of Method 8]

Due to "A color correction method wherein an image in which the color of aforesaid color original image has been corrected from aforesaid color original image is obtained from the color correction conditions calculated from the color correction conditions calculation method described in any of Methods 1 through 7", an evaluated value in which the color of pixels to be reproduced neutrally is corrected neutrally, and thereby colors can favorably be corrected.

[Explanation of Method 9]

Due to "A color correction method wherein the above-mentioned color original image is a color original digital image, color correction conditions in which the colors of color digital image are corrected from a temporarily-color-corrected color digital image again whose colors were corrected by means of a color correction method described in Method 8 and an image in which the colors of aforesaid temporarily-color-corrected color digital image have been corrected by means of the resulting color correction conditions is obtained", as explained in Method 8, the identical process is repeated from a temporarily-color-corrected color digital image which is a favorably-corrected image. Therefore, the expected value in which the color of pixels to be reproduced neutrally are corrected neutrally is extremely high, and an image whose color is extremely favorably corrected can be obtained.

[Explanation of Method 10]

Due to "A color correction method wherein color correction conditions corresponding to each neutral color density value in order to correct the color of pixels to be reproduced neutrally in a color original digital image neutrally are calculated;

the neutral color density value is calculated from the primary color density value of each of the pixels of aforesaid color original digital image; and the color of each pixel in aforesaid color original digital image is corrected due to the color correction conditions corresponding to the neutral color density value calculated", the color of color original digital image is corrected based on the color correction conditions corresponding to the neutral color density value. Therefore, even if the color correction conditions which correct the color of pixels to be reproduced neutrally depending upon the neutral color density value neutrally are different, the color of pixels to be reproduced neutrally can be corrected neutrally. By providing the color correction conditions which cause pixels to be reproduced neutrally in the color original digital image neutrally to all pixels including pixels which should not be reproduced neutrally, colors are corrected to favorable color balance from the neutral color density value high variable density region to low variable density regiona in the color original digital image. In addition, favorable image with no unnaturality can be obtained.

Incidentally, the color correction conditions which correspond to each of the neutral color density values are defined to be the color correction conditions which correct the colors under conditions which are assumed to be suitable for each of the neutral color density values, not constantly adding or multiplying a certain color correction amount. If the conditions assumed to be suitable are different due to the neutral color variable density amount, the conditions become different depending upon the neutral color density value.

[Explanation of Method 11]

Due to "A color correction method wherein color correction conditions in which the colors of color digital image are corrected from a temporarily-color-corrected color digital image again whose colors were corrected by means of the color correction method described in Method 10 and the colors of aforesaid temporarily-color-corrected color digital image are corrected by means of the resulting color correction conditions is obtained", as explained in Method 10, the identical process is repeated from a temporarily-color-corrected color digital image which is a favorably-corrected image. Therefore, an expected value in which the color of pixels to be reproduced neutrally are corrected neutrally is extremely high, and an image whose color is extremely favorably corrected can be obtained.

[Explanation of Constitution 1]

Due to "A color correction conditions calculation apparatus having a statistical calculation means which calculates statistics of individuality number on the density value for a plurality of different colors is calculated from each of the primary color density value of the pixels of the color original image;

a density value determination means which determines the density values of each color corresponding to plural prescribed statistical values are determined based on the statistics of each color calculated by the above-mentioned statistics calculation means;

an extraction conditions introduction means which introduces extraction conditions for extracting specific pixels based on density value of each color determined by the above-mentioned density value determination means for each color;

a neutral pixels extraction means which extracts specific pixels which satisfy all extraction conditions of each color introduced by the above-mentioned extraction conditions introduction means; and a color correction conditions calculation means which calculates color correction conditions based on each primary density value of specific pixels extracted by the above-mentioned extraction conditions introduction means", extraction conditions in which neutral pixels are respectively introduced from the statistics of individuality number on density values of a plurality of different colors not extracting specific pixels based on values set in advance. Specific pixels which satisfy all extraction conditions of each color introduced are extracted from the color original image. Therefore, the expected value to extract pixels to be neutrally extracted is higher compared with extracting specific pixels based on a value set in advance, and the expected value to erroneously extract pixels of an object image having high saturation is low. In addition, the above-mentioned color correction conditions are calculated based on each primary density value of specific pixels extracted. Accordingly, if the color of a color original image is corrected by the use of the color correction conditions calculated by the color correction conditions calculation apparatus of the present method, the expected value in which the color of pixels to be reproduced neutrally is corrected neutrally is high enough that the color can be corrected favorably.

[Explanation of Constitution 2]

Due to "The color correction conditions calculation method described in Constitution 1, wherein the above-mentioned extraction conditions extract specific pixels from either the low variable density region or the high variable density regions", the pixels in either the low variable density region or the high density value region include numerous pixels to be neutrally reproduced of an object with low saturation. Therefore, the expected value to extract pixels to be reproduced neutrally of the object image with low saturation is further higher, and the expected value to erroneously extract high saturation pixels of the object image with high saturation is further lowered. Therefore, based on specific pixels extracted, appropriate color correction conditions can be obtained not substantially receiving influence by the pixels with high saturation. Accordingly, if the color of a color original image is corrected by the use of the color correction conditions calculated by the color correction conditions calculation method of the present method, the expected value in which the color of pixels to be reproduced neutrally is corrected neutrally is high enough that the color can be corrected favorably.

[Explanation of Method 3]

Due to "A color correction conditions calculation apparatus having a statistical calculation means which calculates statistics of individuality number on density values for a plurality of different colors is calculated from each of the primary color density values of the pixels of the color original image;

a density value determination means which determines density value of each color corresponding to plural prescribed statistic values are determined based on the statistics of each color calculated by the above-mentioned statistics calculation means; an extraction conditions introduction means which introduces extraction conditions for extracting specific pixels based on the density value of each color determined by the above-mentioned density value determination means for each of the above-mentioned plural statistic values and for each color;

a neutral pixels extraction means which extracts specific pixels which satisfy all extraction conditions of each color introduced by the above-mentioned extraction conditions introduction means from the color original image for each of the above-mentioned plural statistical values; and a color correction conditions calculation means which calculates color correction conditions for each of the above-mentioned plural statistical values based on each primary density value of specific pixels extracted by the above-mentioned neutral pixels extraction means", the density value of each color corresponding to a plurality of prescribed statistics values is determined based on the statistics of individuality number on the density values on plural of different colors not extracting specific pixels based on values set in advance. Extraction conditions for extracting specific pixels from the density value of each color determined for each of the prescribed plural statistical values and for each color and specific pixels which satisfy all extraction conditions of each color introduced are extracted from the original image for each of the above-mentioned plural statistical values. Therefore, the expected value to extract pixels to be neutrally extracted is higher compared with extracting specific pixels based on a value-set in advance, and an expected value to erroneously extracting pixels of an object image having high saturation is low. In addition, the above-mentioned color correction conditions are calculated for each of the above-mentioned plural statistic values based on each primary density value of specific pixels extracted. Accordingly, further appropriate color correction conditions can be calculated not further receiving the influence by the pixels with high saturation, even if the color correction conditions which neutrally correct the color of pixels to be reproduced neutrally depending upon the density value of the neutral color (a neutral axis changes depending upon density value of neutral color). Accordingly, if the color of a color original image is corrected by the use of the color correction conditions calculated by the color correction conditions calculation method of the present method, an expected value in which the color of pixels to be reproduced neutrally is corrected neutrally is high enough that the color can be corrected favorably.

[Explanation of Constitution 4]

Due to "The color correction conditions calculation apparatus described in Constitution 3, wherein at least one of a plurality of the above-mentioned extraction conditions is to extract specific pixels from the low variable density region and at least one of plural of the above-mentioned extraction conditions is to extract specific pixels from the high variable density regions", the pixels of low variable density region or high density value region include numerous pixels to be neutrally reproduced of an object with low saturation. Therefore, the expected value to extract pixels to be reproduced neutrally of the object image with low saturation is further higher, and an expected value to erroneously extract high saturation pixels of the object image with high saturation is further low. Therefore, based on specific pixels extracted, appropriate color correction conditions can be obtained not substantially receiving influence by the pixels with high saturation. Accordingly, if the color of a color original image is corrected by the use of the color correction conditions calculated by the color correction conditions calculation method of the present method, the expected value in which the color of pixels to be reproduced neutrally is corrected neutrally is so high that the color can be corrected favorably.

[Explanation of Constitution 5]

Due to "the color correction conditions calculation method described in either Constitutions 1 through 4, wherein the above-mentioned color correction conditions calculation means has the second extraction conditions which extracts the second specific pixels based on each of the above-mentioned primary density value of pixels extracted by the above-mentioned neutral pixels extraction means; and color correction conditions are calculated from a color original image based on the second specific pixels extracted by the above-mentioned second neutral pixels extracting means", the second specific pixels are extracted based on the density value of each primary color of pixels extracted. Therefore, numerous pixels to be reproduced neutrally of the density value of each primary color can be obtained from wide region. Accordingly, the expected value to extract pixels to be reproduced neutrally of the object image with low saturation is further higher, and the expected value to erroneously extract high saturation pixels of the object image with high saturation is further lowered. Therefore, based on the second specific pixels extracted, the color correction conditions can be obtained not substantially receiving influence by the pixels with high saturation. Accordingly, if the color of a color original image is corrected by the use of the color correction conditions calculated by the color correction conditions calculation method of the present method, an expected value in which the color of pixels to be reproduced neutrally is corrected neutrally is so high that the color can be corrected favorably.

[Explanation of Method 6]

Due to "The color correction conditions calculation apparatus described in any of Constitution 1 through 5, wherein the above-mentioned statistics is a cumulative density function of the primary colors density value for each of the primary colors", favorable color correction conditions can be calculated with a simple operation.

[Explanation of Constitution 7]

"The color correction conditions apparatus described in any of Methods 1 through 6, wherein the above-mentioned specific pixels are neutral pixels".

[Explanation of Constitution 8]

Due to "A color correction apparatus having the color correction conditions calculation apparatus described in any of Methods 1 through 7; a color correction execution means which obtains an image in which the colors have been corrected from aforesaid color original image under the color correction conditions calculated by the above-mentioned color correction conditions calculation apparatus", an evaluated value in which the color of pixels to be reproduced neutrally is corrected neutrally, and thereby colors can favorably be corrected.

[Explanation of Constitution 9]

Due to "A color correction constitution having a color correction conditions calculation means which calculates color correction conditions corresponding to each neutral color density value in order to correct the color of pixels to be reproduced neutrally in a color original digital image neutrally;

a neutral colors density value calculation means which calculates a neutral color density value from the primary color density value of each pixels of aforesaid color original digital image; and a color correction execution means which obtains an image in which the color of aforesaid color original digital image is obtained due to correction colors from the primary color density value of each pixel of aforesaid original digital image owing to the color correction conditions calculated by the above-mentioned color correction conditions calculation means corresponding to the neutral color density value of aforesaid color original digital image calculated by the above-mentioned neutral color variable density calculation means", the color of color original digital image is corrected due to the color correction conditions corresponding to the neutral color density value. Therefore, even if the color correction conditions which correct the color of pixels to be reproduced neutrally depending upon the neutral color density value neutrally are different, the color of pixels to be reproduced neutrally can be corrected neutrally. By providing the color correction conditions which cause pixels to be reproduced neutrally in the color original digital image neutrally to all pixels including pixels which should not be reproduced neutrally, colors are corrected to favorable color balance from the neutral color density value high variable density region to low variable density regiona in the color original digital image. In addition, favorable image with no unnaturality can be obtained.

Incidentally, the color correction conditions which correspond to each of the neutral color density values are defined to be the color correction conditions which correct the colors under conditions which are assumed to be suitable for each of the neutral color density value, neither constantly adding nor multiplying a certain color correction amount. If the conditions assumed to be suitable are different due to the neutral color variable density amount, the conditions become different depending upon the neutral color density value.

[Explanation of Constitution 10]

Due to "The color correction apparatus described in Constitutions 8 or 9 having a second color correction conditions calculation means which calculates second color correction conditions corresponding to each density value which corrects the colors of pixels to be neutrally reproduced neutrally in a temporarily-color-corrected color digital image again from the temporarily-color-corrected color digital color corrected image obtained by the above-mentioned color correction execution means; and the second color correction means which produces an image whose colors have been corrected from aforesaid temporarily-color-corrected color digital image under the second color correction conditions calculated by the above-mentioned second color correction calculation conditions", as explained in Constitution 8 or 9, the identical process is repeated from a temporarily-color-corrected color digital image which is a favorably-corrected image. Therefore, an expected value in which the color of pixels to be reproduced neutrally are corrected neutrally is extremely high, and an image whose color is extremely favorably corrected can be obtained.

[Explanation of Constitution 11]

Due to "a color reproduction apparatus having a first color reproduction conditions calculation means which calculates the first color reproduction conditions corresponding to each density value which corrects the color of pixels to be neutrally reproduced neutrally in a color original digital image;

a first color reproduction means which produces a temporarily-color-corrected color digital image which temporarily corrects colors from a color origin digital image under the first color reproduction conditions calculated by the above-mentioned first color reproduction conditions calculation means;

a second color reproduction conditions calculation means which calculates the second color reproduction conditions corresponding to each density value which corrects colors of pixels to be neutrally reproduced neutrally in a temporarily-color-corrected color digital image again from a temporarily-color-corrected color digital image obtained by the above-mentioned first color reproduction means; and a second color reproduction means which reproduces colors from a color original digital image under the second color reproduction conditions calculated by the above-mentioned second color reproduction conditions calculation means", the identical process is repeated from a temporarily-color-corrected color digital image which is a favorably-corrected image corresponding to each density value which corrects the color of pixels to be neutrally reproduced neutrally. Therefore, an expected value in which the color of pixels to be reproduced neutrally are corrected neutrally is extremely high, and an image whose color is extremely favorably corrected can be obtained.

[Explanation of Medium 1]

Due to "a storing medium which stores a program for causing a computer to execute operation for calculating color correction conditions for correcting the color of aforesaid color original image from a color original image readably, wherein the above-mentioned program causes the above-mentioned computer to calculate the statistics of the individuality number on the density value for different colors;

to determine the density value of each color corresponding to a prescribed statistic value based on the statistic of each color;

to introduce extraction conditions for each color in order to extract specific pixels from the pixels in the above-mentioned color original image in accordance with the density value of each color calculated;

to extract pixels which satisfy all extraction conditions for each color introduced from a color original image; and to operate the above-mentioned computer in such a manner as to calculate the above-mentioned color correction conditions based on each primary color density value of pixels extracted", the computer is caused to execute the program stored in aforesaid storing medium. Accordingly, extraction conditions which extract neutral pixels are respectively introduced from the statistics on individuality number on density value regarding plural of different colors. Specific pixels which satisfy all extraction conditions introduced are extracted from a color original image. Accordingly, the expected value to extract pixels to be reproduced neutrally is further higher compared to extracting specific pixels based on a value set in advance, and the expected value to erroneously extract pixels of the high saturation object image with high saturation is further low. Therefore, further appropriate color correction conditions can be calculated not further receiving the influence by the pixels with high saturation. Accordingly, if the color of a color original image is corrected by the use of the color correction conditions calculated by executing the program stored in a storing medium in the present claim, an expected value in which the color of pixels to be reproduced neutrally is corrected neutrally is so high that the color can be corrected favorably.

[Medium 2]

"The storing medium described in Medium 1 wherein the above-mentioned specific pixels are neutral pixels".

[Explanation of claim 25]

Due to "a storing medium which stores a program for causing a computer to execute operation for calculating color correction conditions for correcting the color of aforesaid color original image from a color original image readably, wherein the color correction method described in any of Methods 8 through 11 is caused to be executed by the above-mentioned computer", Due to executing the program stored in aforesaid storing medium by the computer, an expected value in which the color of pixels to be reproduced neutrally is corrected neutrally is so high that the color can be corrected favorably.

In the present invention, "color correction" is defined to "correct colors balance of an object or a color original image to a preferable color or to a color to be felt preferably". Incidentally, in the previous application, to call "reproduce colors" was to produce an image wherein the colors have been corrected.

"Different plural colors" described in Methods 1 and 3 and Constitutions 1 and 3 may be primary colors of a color original image, or difference or ratio between each primary colors and those converted to the other colors.

In the present invention, "density value" was referred to as "level" in the previous application. It is a parameter for showing density of the relevant color, including density, reflectance, transmittance, luminance, inputted image signal level and an outputted image signal level. "Low density value region" is the lowest density value and its vicinity density value. From the lowest density value to the highest density value is divided into 10 step, and the low density value is defined to be up to the first step density value or the density value of 10%th or less (5% or less is specifically preferable) from the lowest density value to the highest density value is preferable.

"High density value region" is the highest density value and its vicinity density value. From the highest density value to the lowest density value is divided into 10 step, and the high density value is defined to be up to the first step density value or the density value of 10%th or less (5% or less is specifically preferable) from the highest density value to the lowest density value is preferable.

"Color original image" is a color image comprises an original image. The color original image includes an electronic image such as a color original digital image and a color analogue image and an image recorded on a reflective original or a transmitting original.

When a color original image is a color digital image or a color analogue image, to produce an image in which colors have been corrected from the color original image (to reproduce the colors of the color original image) includes to produce a color digital image and a color analogue image after correcting the colors of a color digital image and a color analogue image, to produce a hard copy after correcting the colors of a color digital image and a color analogue image for outputting and to display an image on a monitor after correcting the colors of a color digital image and a color analogue image. When the color original image is a visually recorded image such as a reflected image or transmitting image, to optically print on a light-sensitive material for printing under printing conditions wherein colors have been corrected from the color original image, to image-read the color original image for obtaining a color digital image and a color analogue image and to produce a color digital image and a color analogue image after correcting the colors of a color digital image and a color analogue image, to image-read the color original image for obtaining a color digital image and a color analogue image and to produce a hard copy after correcting colors and to image-read the color original image for obtaining a color digital image and a color analogue image and to produce and to display on a monitor after correcting colors.

In addition, as a specific pixel, a pixel for calculating extraction conditions for extracting a neutral pixel is preferable. In addition, a pixel assumed to be a neutral pixel is preferable. Incidentally, in the present invention, "neutral" means saturation of 0 or its vicinity or reproduced in the above-mentioned manner. "Neutral pixel" is a pixel to be reproduced neutrally. In addition, high saturation is defined to have a great saturation object, or ones assumed as such.

Statistics of individuality number on density value includes cumulative density function such as density value, transmittance and inputted image signal density value, cumulative degree number and frequency distributionship. When statistics of individuality number on density value is gathered, in order to maintain effective statistic amount for favorably color correcting, as pixel numbers for taking statistics, it is preferable that the number of pixels is 500 or more, and specifically 3000 or more. In addition, in order to reproduce favorable color balance, regarding bit number for representing gradation per pixel, 8 bits or more is preferable and specifically 10 bits or more is more preferable.

DETAILED DESCRIPTION OF THE PREFERRED EMBODIMENT

Hereinafter, an embodiment of a practical example of the present invention will be described. However, the present invention is not limited thereto. In the embodiment, there are definitive expressions. They exhibit preferable examples of the present invention. They limit neither the meaning of the technical terms of the present invention nor its technical scope.

Embodiment 1

An imaging system of the present embodiment is an example of the present invention, which is an example of a system wherein an outputted image is obtained by correcting the color of color original digital photographic image which is a color original photographic image. This is a system in which, after a silver halide color negative photographic light-sensitive film housing container (hereinafter, referred to as a cartridge), for photographing, which houses a long roll type silver halide color negative photographic light-sensitive film (hereinafter, referred to as a film) for photographing having a B (=blue) light-sensitive and a Y (=yellow) coloring layer, a G (=green color) light-sensitive and an M (=magenta) coloring layer and an R (=red) light-sensitive and a C (=cyan) coloring layer is inserted through an insertion port of the present system, the present system automatically subjects aforesaid film to photographic processing for imaging, obtains a color original digital photographic image, obtains outputting image after correcting the color of the color digital original photographic image, exposes an image subjected to image processing onto a photographic paper (hereinafter, referred to as a paper) which is a silver halide color photographic light-sensitive material for printing having a B light-sensitive and Y coloring layer, a G light-sensitive and M coloring layer and an R light-sensitive and C coloring layer subjects the exposed paper to photographic paper processing for preparing prints and assortings.

Figure 1:
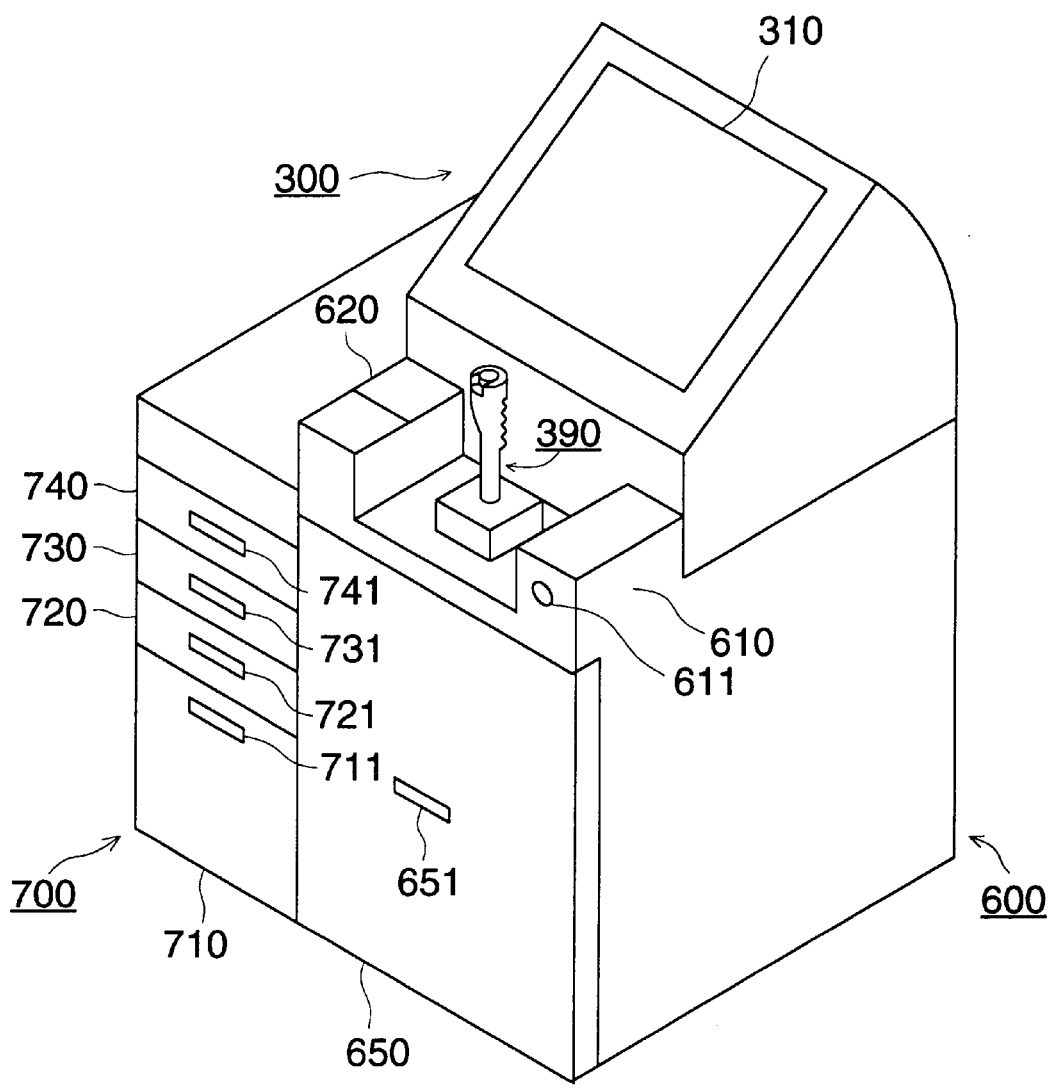
FIG. 1 is a schematic external drawing of an imaging system in Embodiment 1.
Figure 2:
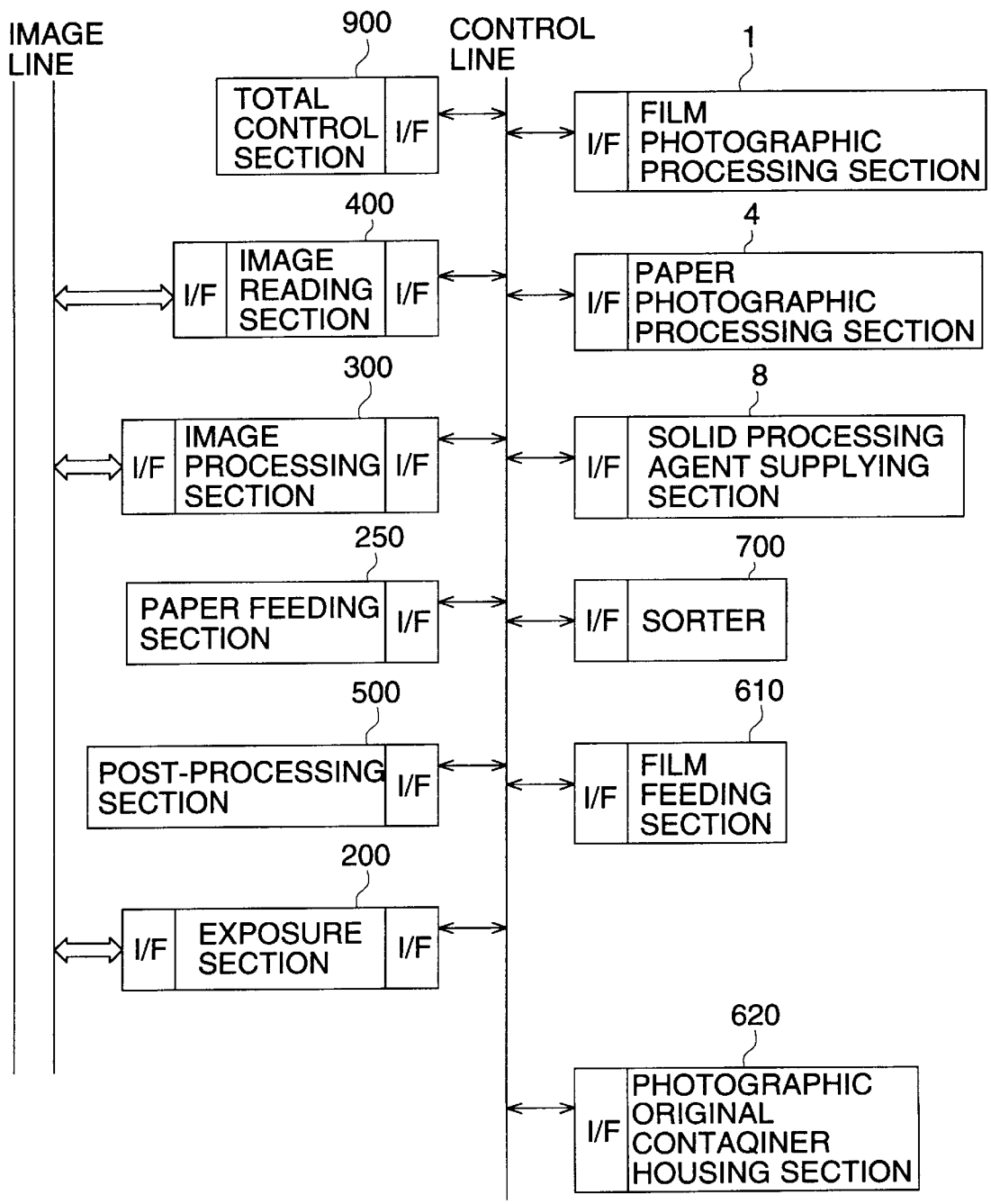
FIG. 2 is a schematic block diagram of Embodiment 1.
Figure 3:
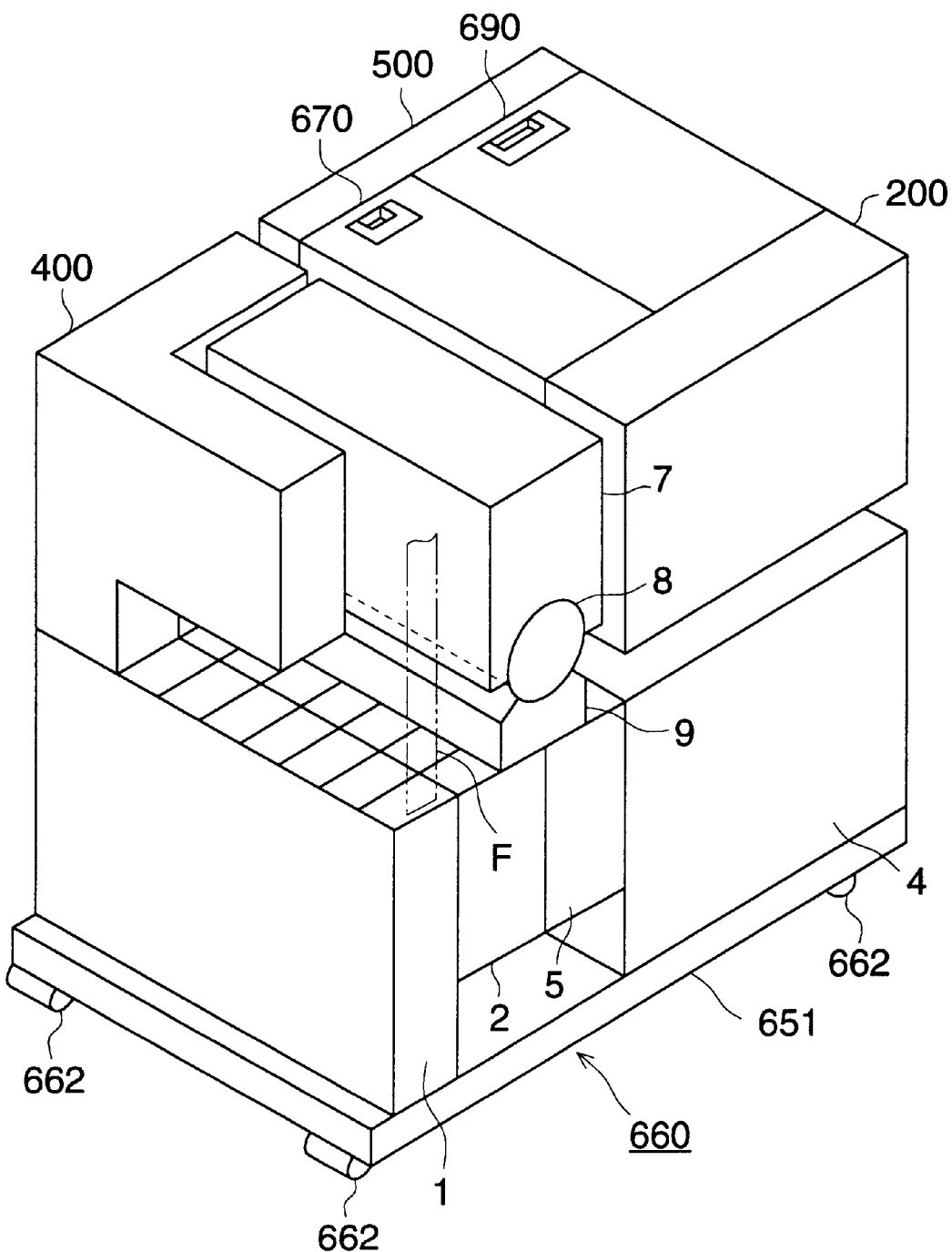
FIG. 3 is a perspective view of an apparatus main body of Embodiment 1.

As shown in FIG. 1 (a schematic appearance drawing), FIG. 2 (a schematic block diagram) and FIG. 3 (a perspective view of apparatus main body 660), the imaging system of the present embodiment is composed of film thrusting section 610 which thrusts a film housed in a cartridge inserted through insertion port 611 by an operator, film photographic processing section 1 wherein aforesaid thrusted film is dipped in a solution for photographic processing to make an original photographic image, original photographic image container housing section 620 which houses an original photographic image container for housing aforesaid original photographic image and supplies housed original photographic image container to image-reading section 400, image-reading section 400 which image-reads aforesaid original photographic image obtained in film photographic processing section 1 for obtaining a color original digital image, winds the image-readd original photographic image and houses the original photographic image in the original photographic image container supplied by photographic original container housing section, image processing section 300 which obtains outputting image by correcting the color of the color original digital image sent from image-reading section 400, paper feeding section 250 (in FIG. 3, it is not visible due to be hidden by exposure section 200) which feeds a paper onto exposure section 200 from magazines 670 and 690, exposure section 200 which exposes the outputted image from image processing section 300 onto a paper fed from paper feeding section 250, paper photographic processing section 4 wherein a paper exposed in exposure section 200 is dipped in a solution subjected to photographic processing, post-processing section 500 which conducts post-processing such as to measure the density value of a print obtained in paper photographic processing section 4 for controlling exposure conditions by means of the development conditions, sorter 700 which assorts original photographic images which had been imagewise read in image-reading section 400 and housed in the original photographic container and prints from post-processing section 500, solid processing agent supplying section 8 which supplies solid processing agents to replenishing tank 2 in film photographic processing section 1 and replenishing tank 5 in paper photographic processing section 4 from solid processing agent container 7 through solid processing agent introduction section 9 and total controlling section 900 which controls the total apparatus.

Each of the above-mentioned sections are connected by means of control lines each other. In addition, image-reading section 400, image processing section 300 and exposure section 200 are connected by means of image lines. Image processing section 300 is provided with monitor 310 which displays an image and instruction inputting section 390 for inputting instruction by the operator. Aforesaid image processing section not only displays an image subjected to color correction on monitor 310 and outputs as it is but also to outputs the image after providing another kind of image processing (such as image synthesis) based on inputting from instruction inputting section 390. With regard to sorter 700, prints and original photographic image of the same order are supplied to sorter bins 710 to 740 so that picking up is easy and forgetting to picking up can be prevented. On picking up port of each sorter bin, lids with a knob 711–741 are provided. In addition, apparatus main body 660 is enclosed by external frame 600. When door 650 having handle 651 on the front thereof is opened, apparatus main body 660 can be withdrawn.

The purpose of the color correction of the present example is to equivalently reproduce B, G and R pixels in color original digital image to be reproduced neutrally. In addition, a process in which pixels in the color original digital images to be reproduced neutrally, i.e. B, G and R pixels are equivalently reproduced is also subjected to pixels which should not be reproduced neutrally for color correction. Due to this technology, preferably color-reproduced image can be obtained.

Aforesaid color correction is conducted in image processing section 300, wherein pixels to be reproduced neutrally are extracted from a color original digital image, a color correction conditions are calculated based on pixel information extracted and thereby aforesaid color original digital image is subjected to color correction in accordance with the calculated color correction conditions. Image processing section 300 outputs images obtained by means of color correction.

Figure 4:
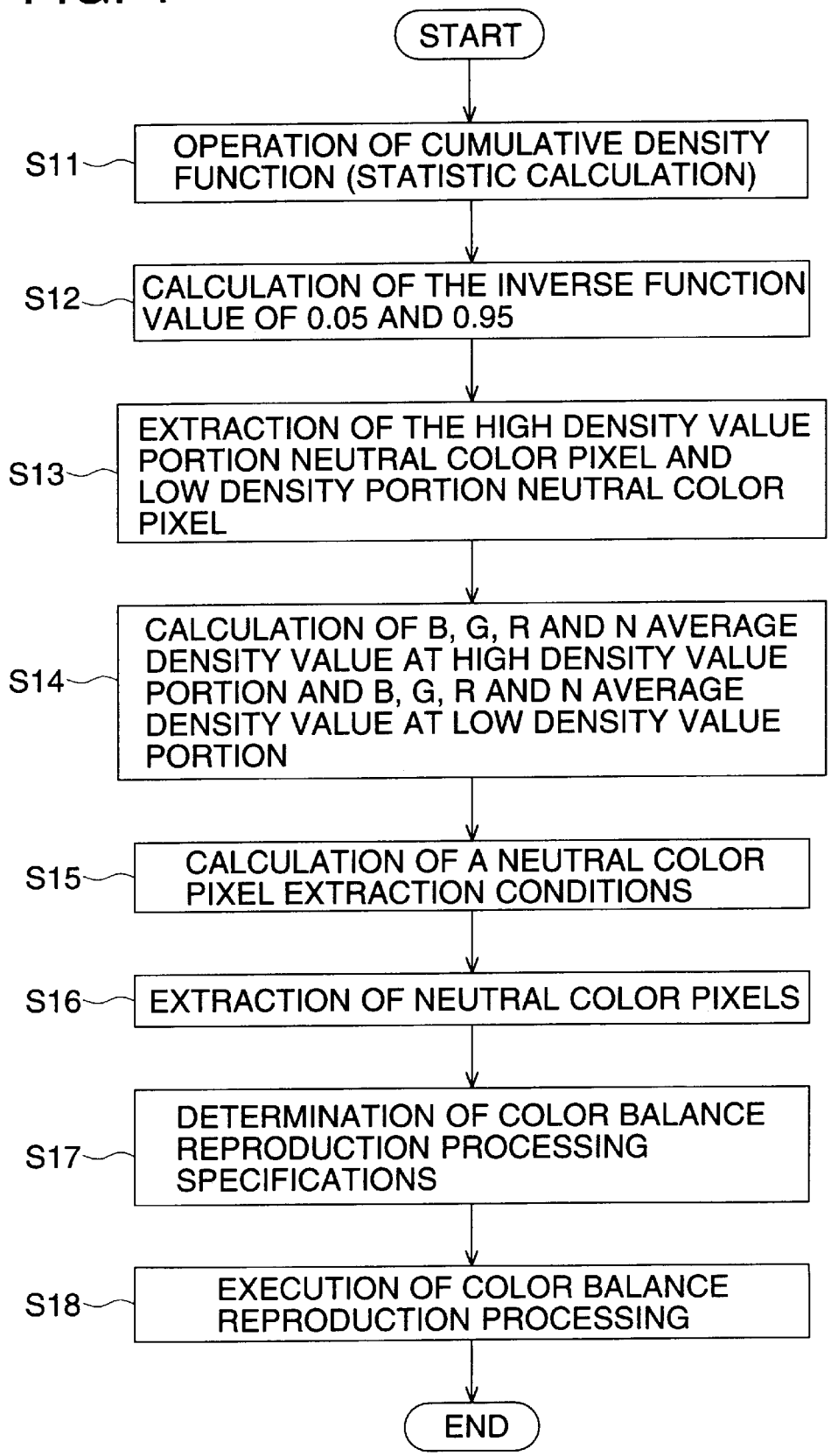
FIG. 4 is a flow chart of color reproduction processing of Embodiment 1.

In addition, all of color original digital image, images processed in image processing section 300, images displayed on monitor 310 and outputting image are composed of 1536×1024 pixels with each having a 10-bit gradation. Before the color correction conditions are determined (S11 through S17 in a flow chart for color correction as shown in FIG. 4), pixels are extracted for each of 8 lines×8 rows. After producing images composed of 128×192 pixels respectively having a 10bit gradation, the color correction conditions are determined. Based on the color correction conditions determined, color of the color original digital images are corrected. In addition, in order to reduce influence by bit reduction in an operation during calculation the color correction conditions, 12 bits may be allotted per 1 pixel until the color correction conditions are calculated. Hereinafter, based on the color correction flow chart as shown in FIG. 4, color correction of the present embodiment will be explained. Incidentally, color correction may be conducted, after calculating the color correction conditions, for plural frames of color original digital images recorded on one roll of film. However, in order to simplify explanation, hereinafter, explanation will be conducted for a case when the color correction is conducted for each frame of color original digital images. In addition, B, G, R and N density of each pixel in one frame of color original digital images are represented by symbols ($B_{ij}$, $G_{ij}$, $R_{ij}$ and $N_{ij}$). Incidentally, N density $N_{ij}$ represents density of neutral color satisfying the following equation:

$$N_{ij}=(B_{ij}+G_{ij}+R_{ij})/3)$$

Figure 5:
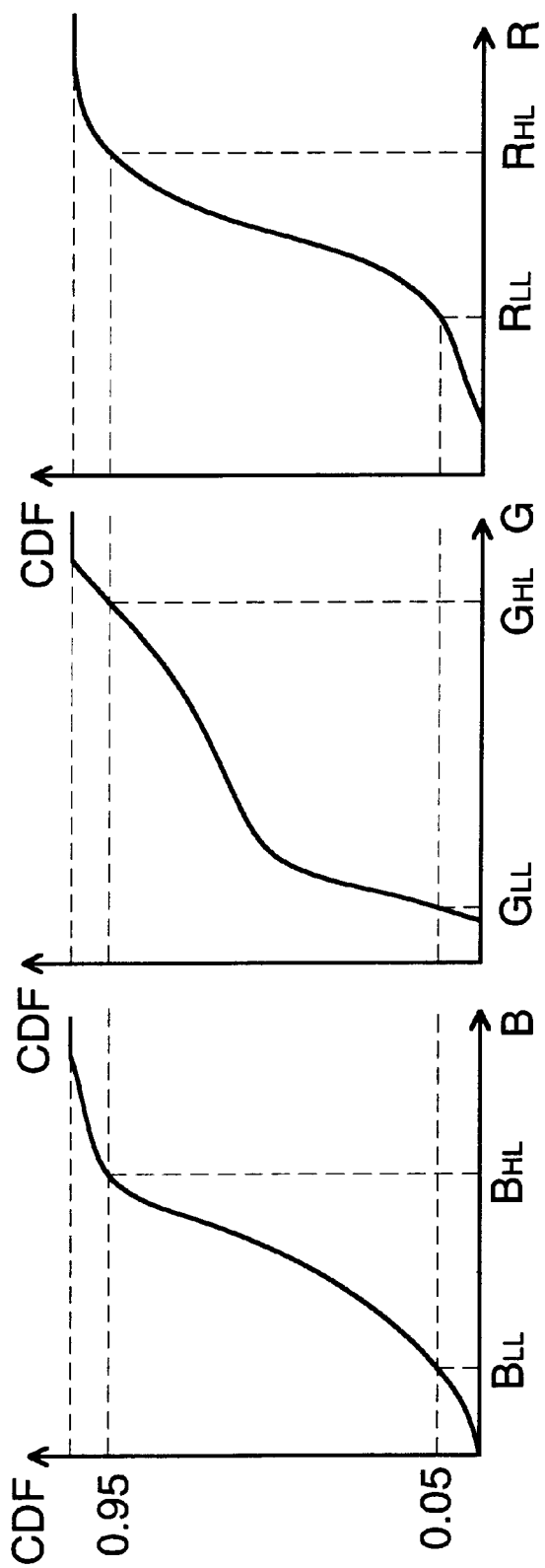
FIG. 5 is a drawing showing an example of a cumulative density function of Embodiment 1.

In S11, as shown in FIG. 5, for B, G and R separately, cumulative density function (CDF) of the density of each pixel of 1536×1024 pixels respectively having 10 bits compressed to ⅛ laterally and transversally from 1 frame of color original digital image outputted from image-reading section 400 is calculated. FIG. 5 shows an example of the cumulative density function (CDF) measured for each of B, G and R. To calculate aforesaid cumulative density function (CDF) comes under "to calculate statistics of the number corresponding to the amount of variable density for plural different colors".

As shown in FIG. 5, in A12, inverse function values (density values $B_{LL}$, $G_{LL}$ and $R_{LL}$) corresponding to 5% of the cumulative density (0.05 of the total cumulative density) and inverse function values (density values $B_{HL}$, $G_{HL}$ and $R_{HL}$) corresponding to 95% of the cumulative density (0.95 of the total cumulative density) are calculated for B, G and R from the resulting cumulative density function. Hereinafter, the inverse function values (density values $B_{LL}$, $G_{LL}$ and $R_{LL}$) corresponding to 5% of the cumulative density (0.05 of the total cumulative density) are defined to be the low density portion critical density (density values $B_{LL}$, $G_{LL}$ and $R_{LL}$), and inverse function values (density values $B_{HL}$, $G_{HL}$ and $R_{HL}$) corresponding to 95% of the cumulative density (0.95 of the total cumulative density) are defined to be high density portion critical density (density values $B_{HL}$, $G_{HL}$ and $R_{HL}$). These correspond to "to calculate the amount of variable density corresponding to a prescribed statistic values based on statistic of each color calculated".

In S13, high density value portion neutral pixels and low density value portion neutral pixels are extracted. First, pixels having B density value higher than B color high density value portion critical density value $B_{HL}$, concurrently having G density value having higher G color high density value portion critical density value $G_{HL}$ and concurrently having R density value having higher density value portion critical density value $R_{HL}$ are extracted to be high density value portion neutral pixels. In addition, pixels having B density value lower than B color low density value portion critical density $B_{LL}$, concurrently having G density value having lower G color low density value portion critical density $G_{LL}$ and concurrently having R density value having lower density value portion critical density $R_{LL}$ are extracted to be low density value portion neutral pixel. These correspond to "to introduce extraction conditions for a specific pixel for each color from the pixel of the above-mentioned color original image by means of the amount of variable density value of each color determined and to extract a pixel which satisfies all of the extraction conditions for each color introduced".

Namely, pixels satisfying the following three conditions are extracted as a high density value portion neutral pixels:

$B \geq B_{HL}$
$G \geq G_{HL}$
$R \geq R_{HL}$

In addition, Namely, pixels satisfying the following three conditions are extracted as a low density value portion neutral pixels:

$B \leq B_{LL}$
$G \leq G_{LL}$
$R \leq R_{LL}$

The above-mentioned method provides higher expected values for extracting pixels to be reproduced neutrally compared to extracting neutral pixels based on pre-set values, and provides lower expected values for erroneously extracting high saturation pixels of an object having high saturation. In addition, since there are numerous objects having low saturation at high density value portion (high density value region) and at low density value portion (low density value region), an expected value to extract pixels, to be reproduced neutrally, and which are pixels of an object image having low saturation is higher, and an expected values for erroneously extracting high saturation pixels of an object image having high saturation is lower.

Incidentally, the reason why there are numerous objects having low saturation at the high density value portions (high density value region) and the low density value portion (low density value region), is that the high density value portion (high density value region) and the low density value portion (low density value region) are density values formed with a high exposure amount or a low exposure amount. To be high exposure amount is because the object reflects close to the entire reflection, i.e. neutral. To be low exposure amount is an exposure amount in the low sensitivity region in a light-sensitive material, a photographing device and a image-reading device. Accordingly, color is not identified. As a result, an object is recorded neutrally.

In step S14, B, G and R average density values $B_{HM}$, $G_{HM}$ and $R_{HM}$ of the extracted high density portion neutral pixels are respectively calculated. In addition, B, G and R average density values $B_{LM}$, $G_{LM}$ and $R_{LM}$ of the extracted low density value portion neutral pixels are respectively calculated. In addition, from B, G and R average density values $B_{HM}$, $G_{HM}$ and $R_{HM}$ of the extracted high density value portion neutral pixels, average density values $N_{HM}$ of neutral color of the high density value portion neutral pixel is calculated employing the following equation. In addition, from B, G and R average density value $B_{LM}$, $G_{LM}$ and $R_{LM}$ of the extracted low density value portion neutral pixels of the extracted low density value portion neutral pixels, average density value $N_{LM}$ of neutral color of the high density value portion neutral pixels are calculated employing the following equation.

$$N_{LM}=(B_{LM}+G_{LM}+R_{LM})/3$$

$$N_{HM}=(B_{HM}+G_{HM}+R_{HM})/3$$

In step S15, conditions for extracting neutral pixels are calculated. Here, to extract neutral pixels will be explained based on FIG. 6 which is a conceptual drawing showing neutral pixel extraction conditions in the color space. In the B, G and R color space, axis N represents an axis of the average density value (N density) of the B, G and R density of the same pixel. Axis B represents the B density value, axis G represents the G density value and axis R represents the R density value. Axes B, G and R correspond to each side of a cube. A bold line L represents a line assumed to be neutral in the color original digital image. Against aforesaid axis L, a region having a prescribed width is extracted as a neutral pixel. First, accordingly, a relationship equation between aforesaid axis L and B, G and R axis. Namely, from the average B, G, R and N density values $B_{HM}$, $G_{HM}$, $R_{HM}$ and $N_{HM}$ of a high density value portion neutral pixels calculated in S14 and the average B, G, R and N density values $B_{LM}$, $G_{LM}$, $R_{LM}$ and $N_{LM}$ of a high density value portion neutral pixel, the neutral pixel extraction conditions are calculated. First, the relationship of B, G and R density value against N density value represented by the following equation will be calculated.

$$B=\alpha_B \times N + \beta_B$$

$$G=\alpha_G \times N + \beta_G$$

$$R=\alpha_R \times N + \beta_R$$

Incidentally, the above-mentioned equation satisfies $N=(B+G+R)/3$. In addition, $\alpha_B$, $\alpha_G$, $\alpha_R$, $\beta_B$, $\beta_G$ and $\beta_R$ can be calculated by the following equations.

$$\alpha_B=(B_{HM}-B_{LM})/(N_{HM}-N_{LM})$$

$$\alpha_G=(G_{HM}-G_{LM})/(N_{HM}-N_{LM})$$

$$\alpha_R=(R_{LM}-R_{LM})/(N_{HM}-N_{LM})$$

$$\beta_B = B_{LM} - \alpha_B \times N_{LM}$$

$$\beta_G = G_{LM} - \alpha_G \times N_{LM}$$

$$\beta_R = R_{LM} - \alpha_R \times N_{LM}$$

Figure 6:
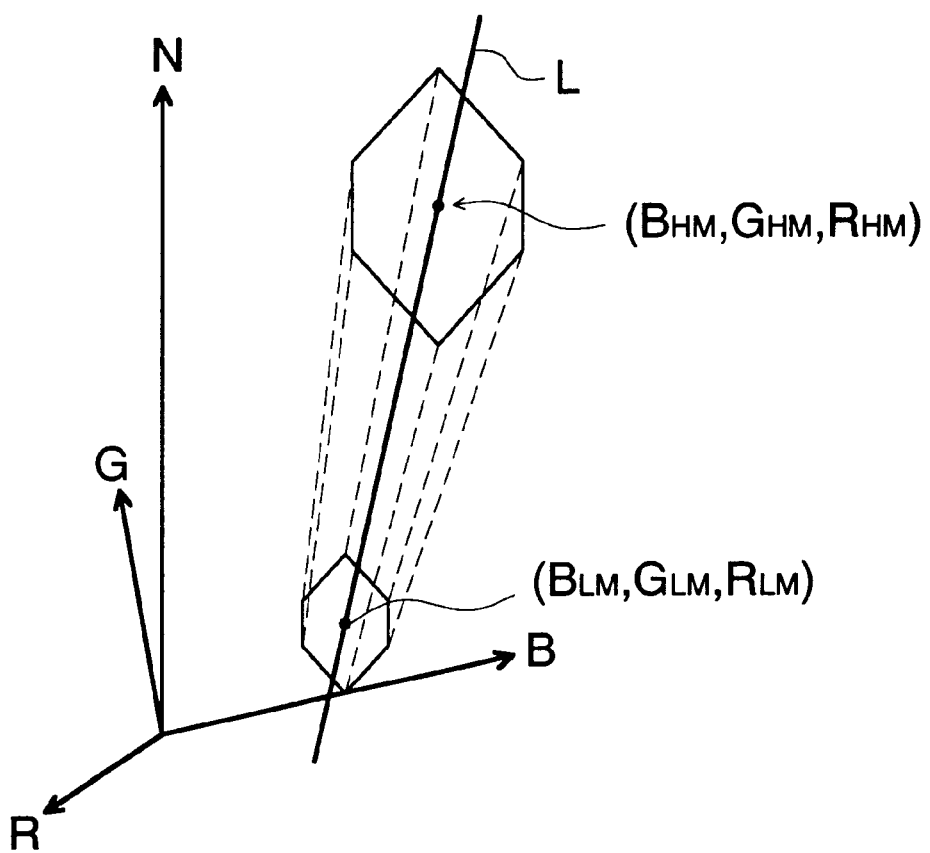
FIG. 6 is an explanation drawing of a color space of Embodiment 1.

Against aforesaid lines, the region within a prescribed width is calculated. Aforesaid region satisfies the neutral pixel extraction conditions (6 inequalities) described below. In terms of the color space, it becomes a hexagonal cylinder as shown in FIG. 6. In order to calculate a region within the prescribed width against aforesaid lines, from coefficients $\alpha_B$, $\alpha_G$, $\alpha_R$, $\beta_B$, $\beta_G$ and $\beta_R$ calculated as above, neutral pixel extraction conditions described below will be calculated. Aforesaid neutral pixel extraction conditions evaluate whether or not each pixel is a neutral pixel by judging whether or not all of the 6 following conditions are satisfied from the density value (Bij, Gij, Rij and Nij) for each pixel of color original digital image for one frame.

$$(\alpha_B - \alpha_{B0}) \times Nij + \beta_B - \beta_{B0} \leq Bij$$

$$Bij \leq (\alpha_B + \alpha_{B0}) \times Nij + \beta_B + \beta_{B0}$$

$$(\alpha_G - \alpha_{G0}) \times Nij + \beta_G - \beta_{G0} \leq Gij$$

$$Gij < (\alpha_G + \alpha_{G0}) \times Nij + \beta_G + \beta_{G0}$$

$$(\alpha_R - \alpha_{R0}) \times Nij + \beta_R - \beta_{R0} \leq Rij$$

$$Rij \leq (\alpha_R + \alpha_{R0}) \times Nij + \beta_R + \beta_{R0}$$

Here, coefficients $\alpha_{B0}$, $\alpha_{G0}$ and $\alpha_{R0}$ and constants $\beta_{B0}$, $\beta_{G0}$ and $\beta_{R0}$ represent prescribed positive numerals. Due to these, the width of range capable of being judged to be neutral can be determined. Incidentally, by multiplying coefficients $\alpha_{B0}$, $\alpha_{G0}$ and $\alpha_{R0}$ with N color density value, the width of the region can be changed. Due to the above, in the case of pixels having a low N color density value, even an object having a large color polarization tends to produce small density value differences from the relationship equation of B, G and R density value on the above-mentioned N density. On the contrary, in the case of pixels having a high N color density value, even an object having a large color polarization tends to produce a large density value differences from the relationship equation of B, G and R density value on the above-mentioned N density. In the case of a low N color density value, by reducing the width of the region, extraction of a high saturation pixel is prevented. In the case of a high N color density, by increasing the width of the region, extraction of the neutral pixels is prevented. Accordingly, an appropriate neutral pixels can be extracted.

Incidentally, step S14 ad S15 correspond to the statement "to introduce the second extraction conditions which extracts specific second pixel from the above-mentioned color original image pixel, all over again, based on each primary color density value of the pixels extracted".

In step S16, pixels which satisfies all neutral pixel extraction conditions calculated in S15 are extracted as the second neutral pixel. S16 corresponds to the statement "to the second pixel satisfying the second extraction conditions introduced".

As described above, neutral pixels are extracted for the high density value portion and the low density portion. From B, G, R and N average density values of the neutral pixels extracted for each of high density value portions and the low density value portions, conditions for extracting neutral pixels which vary depending upon the neutral color density value are calculated again. Based on the calculated conditions, the second neutral pixels are extracted. Therefore, an expected value to extract pixels, to be reproduced neutrally, which are pixels of an object image having low saturation as the second neutral pixel is high. On the contrary, an expected value to extract pixels which are pixels of an object image having high saturation is low. Concurrently with this, an expected value to extract the appropriate pixels which are numerous pixels to be reproduced neutrally from wider density value range becomes high, and thereby color correction conditions which can corrects in such a manner that preferable color reproduction can be made.

In step S17, the color correction conditions are determined based on the extracted second neutral pixels. From B, G, R and N density values of the extracted second neutral pixels, neutralizing conversion equation is calculated. Here, "neutralizing conversion equation" is an equation to convert each pixel ($B_{ij}$, $G_{ij}$ and $R_{ij}$) of color original digital image in order to reproduce preferable colors by neutrally correcting the color of pixels in the color original digital image to be reproduced neutral. Coefficients ($\alpha_{BN}$, $\alpha_{GN}$ and $\alpha_{RN}$) and constants ($\beta_{BN}$, $\beta_{GN}$ and $\beta_{RN}$) of the primary regression equation from B and N, G and N and R and N of the extracted neutral color pixel by means of the method of least square so that the following neutralizing conversion equations are calculated.

$$B'_{ij} = \alpha_{BN} \times B_{ij} + \beta_{BN}$$

$$G'_{ij} = \alpha_{GN} \times G_{ij} + \beta_{GN}$$

$$R'_{ij} = \alpha_{RN} \times B_{ij} + \beta_{RN}$$

Figure 8:
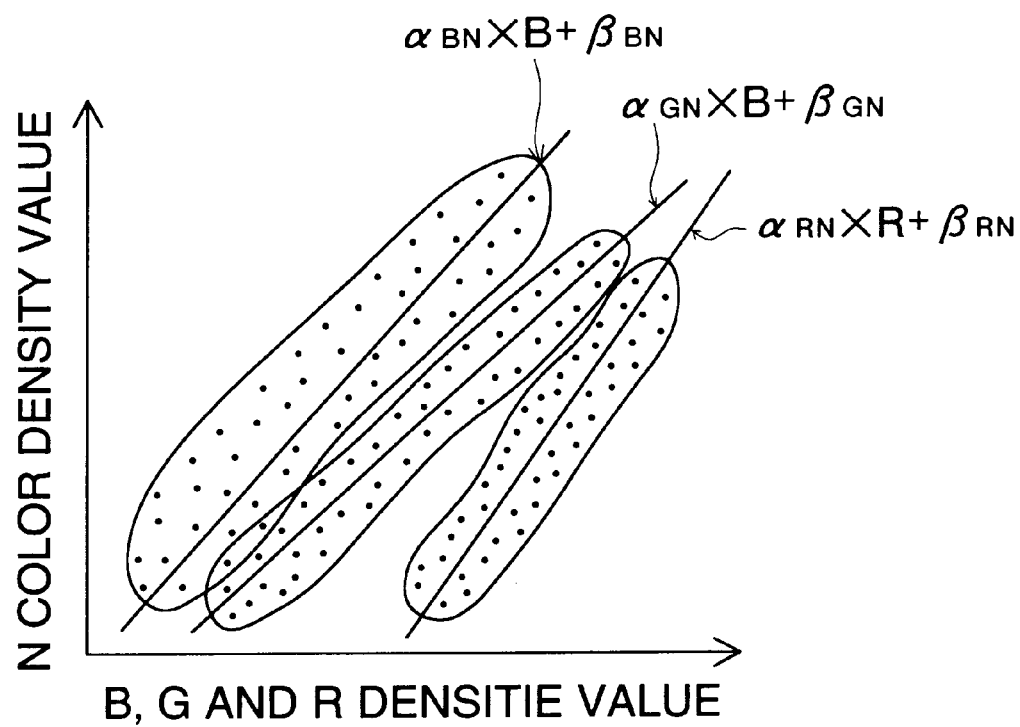
FIG. 8 is an explanation drawing of a neutralization conversion equation.

FIG. 8 shows a relationship between the extracted R, G and B density values and N density value, and a regression line (primary regression equation).

Due to above, based on each of original density value of the second neutral pixel extracted from a wide range, the neutralizing conversion equation corresponding to each original color density value which corrects the color of color original image is calculated. Therefore, even if the neutral axis changes depending upon density value, a neutralizing conversion equation which corrects the color in such a manner that preferable color reproduction can be conducted can be calculated. Incidentally, step S17 corresponds to "calculate the above-mentioned color correction conditions based on the extracted second pixels."

In step S18, all pixels of the color original digital images are converted by means of the neutralizing conversion equation calculated in step S17, so that color-corrected images ($B_{ij}$, $G_{ij}$ and $R_{ij}$) are obtained. Incidentally, step S18 corresponds to obtained images wherein the color of aforesaid color original image has been corrected".

Due to the above-mentioned flow, color correction is conducted. Incidentally, in the present embodiment, image processing section 300 combines the functions statistic calculation means in "WHAT IS CLAIMED IS:", density value determination means, extraction condition introduction means, neutral pixel extraction means, color reproduction means, color reproduction condition calculation means and color reproduction execution means. Image processing section 300 is composed of a micro computer which at least has a memory which stores program necessary for executing functions of the above-mentioned means and operation elements. Incidentally, as a varied embodiment of the present example, each of the above-mentioned means may be housed and operated separately.

As a variation of the above-mentioned embodiment, when the number of pixels of the high density value neutral pixel extracted in step S13 is under a prescribed ratio (for example, 1%) of the total pixel number, return to step S12, where calculated inverse function values (densities $B_{HL}$, $G_{HL}$ and $R_{HL}$) corresponding to 90% of cumulative density (0.90 of the entire cumulative density) from cumulative density function calculated for B, G and R). Hereinafter, operation is allowed to return to A13 provided that the inverse function values (densities $B_{HL}$, $G_{HL}$ and $R_{HL}$) corresponding to 90% (0.90 of the entire cumulative density) of calculated cumulative density are regarded as the high density portion critical density values ($B_{HL}$, $G_{HL}$ and $R_{HL}$) In the same manner, when the number of pixels of the low density value neutral pixels extracted in S13 is under a prescribed ratio (for example, 1%) of the total pixel number, return to S12, where calculated inverse function values (density $B_{LL}$, $G_{LL}$ and $R_{LL}$) corresponding to 10% of cumulative density (0.10 of the entire cumulative density) from cumulative density function calculated for B, G and R). Hereinafter, operation is allowed to return to step S13 provided that inverse function values (density values $B_{LL}$, $G_{LL}$ and $R_{LL}$) corresponding to 10% (0.10 of the entire cumulative density) of calculated cumulative density is regarded as the high density value portion critical density ($B_{LL}$, $G_{LL}$ and $R_{LL}$.) Due to the above-mentioned procedure, an appropriate average density value of the low density value portion and high density portion may be calculated.

Embodiment 2

While the Embodiment 1 conducts color correction once, the present embodiment is the same as Embodiment 1 except that images ($B_{ij}'$, $G_{ij}'$ and $R_{ij}'$) obtained through color correction are subjected to color correction again in the same process as color digital inputting images ($B_{ij}$, $G_{ij}$ and $R_{ij}$).

Since the same process is repeated from a temporarily color corrected color digital image, which is an image whose color was corrected to a favorable color balance, an image whose color has been extremely favorably corrected.

Incidentally in the present embodiment, image processing section 300 combines the functions statistic calculation means in "WHAT IS CLAIMED IS:", density value determination means, extraction condition introduction means, neutral pixel extraction means, color reproduction means, color reproduction condition calculation means and color reproduction execution means. Image processing section 300 is composed of a micro-computer which at least has a memory which stores program necessary to execute functions of the above-mentioned means and operation elements.

Embodiment 3

Figure 7:
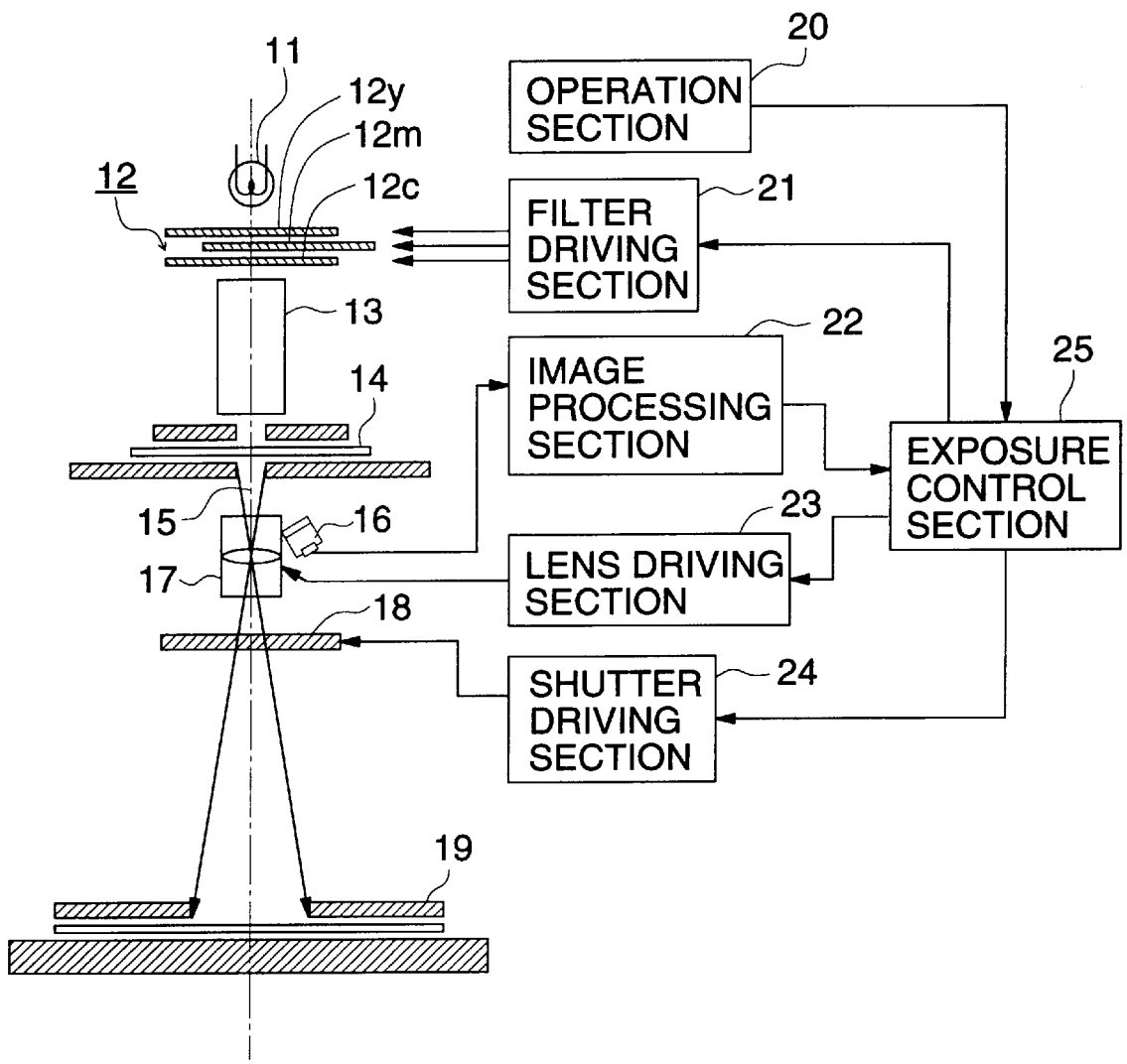
FIG. 7 is an overall block diagram of a photographic printing device of Embodiment 3.

An imaging system of the present embodiment is one practical example of the present invention. It is an example of a system in which image on a frame of a color negative film is projected and printed on color photographic paper and, by developing a color photographic paper projected and printed by a developing machine not illustrated, the color of the image on a frame of a color negative film of aforesaid color negative film is corrected for obtaining an outputted image. Hereinafter, the present system will be explained referring to FIG. 7 which is a schematic block diagram of a photographic printing device. Exposure optical source 11 represents a light source for the exposure light. Color correction filter section 12 has y, m and c color light cutting filter or a light regulation filter, and conducts color correction of exposure light from exposure optical source 11. Diffusion box 13 causes exposed light which has passed color correction filter 12 to be diffused. Entire image on a frame of a color negative film 14 positioned on negative mask 15 is uniformly illuminated. Negative carrier positions the image on a frame of a color negative film on negative mask 15. Zoom lens 17 is composed of a zooming mechanism and an aperture for magnifying printing magnification. Aforesaid zoom lens 17 image-forms beam which transmitted the image on a frame of a color negative film of color negative film positioned on negative mask 15 onto photographic paper which is positioned on the paper mask. Shutter section 18 provided downstream of the exposure optical path from zoom lens 17 controls exposure time by means of a shutter.

In addition, below negative mask 15 and out of the exposure path, photographing section 16 which photographs both surimage on a frame of a color negative films of color negative film 14 positioned on negative mask 15 is located. Images photographed by photographing section 16 are sent to image processing section 22. Image processing section 22 determines printing density value, density value correction amount and color correction amount of the original image. Then, calculated printing density value, density value correction amount and color correction amount of an original image are sent to exposure control section 25. From operation section 20, variable magnification on its original image is inputted. Variable magnification on its original image inputted in the exposure control section is sent. Exposure control section 25 determines an appropriate printing exposure amount of the original image by printing the density value of the original image sent from the image processing section, density value correction amount and color correction amount. Exposure time, color correction control amount and lens aperture control amount are calculated from the printing density value of the original image, the determined printing exposure amount and variable magnification on the original image sent from operation section 20. From exposure control section 25, a filter driving and controlling signal is sent to filter driving section 21 depending upon the color correction control amount, a lens aperture control signal depending upon lens aperture control amount calculated and a zoom control signal depending upon variable magnification are sent to lens driving section 23, and a shutter driving control signal depending upon exposure time calculated is sent to shutter driving section 24. Filter driving section 21 controls y, m and c filter in filter section 12 depending upon the filter driving controlling signal sent. Lens driving section 23 controls the zoom mechanism of zoom lens 17 depending upon the zoom control signal sent, and also controls the zoom mechanism of zoom lens 17 depending upon the zoom control signal sent. Shutter driving section 24 controls the driving of the shutter in shutter driving section 24 depending upon the shutter driving control signal sent.

Due to the above-mentioned structure, illuminating beam which has passed color correction filter section 12 and diffusion box 13 from exposure optical source 11, and which has transmitted the image on a frame of a color negative film 14 positioned at negative mask 15 passes zoom lens 17 and shutter section 18 to be printed on photographic paper 19 positioned on the paper mask.

Incidentally, the present embodiment determines the color correction amount for determining the printing exposure amount. In addition, by means of the color correction amount, colors are corrected for favorable color balance. Aforesaid determination of the color correction amount is conducted in the image processing section in the above-mentioned apparatus. By determining the color correction amount from inputting image for one image on a frame of a color negative film in image processing section 22, determining the printing exposure amount in exposure control section 25 based on the determined color correction amount, printing while controlling printing exposure and developing a color negative film by a developing machine (not illustrated), color balance of the image on a frame of a color negative film of the color negative film is reproduced. In photographing section 16, a negative film is photographed with a CCD having several hundred thousands pixels. In photographing section 16, the pixel number is subjected to reduction processing. Both of image outputted from image-reading section 16 and an image for determining the color correction amount has 128×192 pixels with 10-bit gradation.

In addition, the process for calculating the color correction amount is identical to the flow of the color correction in Embodiment 1 except that an image outputted from photographing section 16 is used in place of color original digital image and A17 is placed with S17. In the present embodiment, the color correction amount is calculated in steps S17 and S18.

First, in step S17, based on the second neutral pixel extracted, the B, G and R average density values of the second neutral pixel is calculated. Incidentally, the B, G and R average density values of the second neutral pixel is determined to be $B_{FM}'$, $G_{FM}'$ and $R_{FM}'$.

In S18, the difference between the average density values ($B_{FM}'$, $G_{FM}'$ and $R_{FM}'$) of the second neutral pixels and the average density values ($B_{FM}$, $G_{FM}$ and $R_{FM}$) of the image on a frame of a color negative film is obtained as the color correction amount ($\Delta B = B_{FM}' - B_{FM}$, $\Delta G = G_{FM}' - G_{FM}$, $\Delta R = R_{FM}' - R_{FM}$). The color correction amount may be used by reducing the saturation of the frame. Due to aforesaid color correction, printing having favorable color balance can be obtained.

Due to the above-mentioned structure, color correction is conducted. Incidentally, in the present embodiment, image processing section 22 combines the functions of statistic calculation means in "WHAT IS CLAIMED IS:", density value determination means, extraction condition introduction means, neutral pixel extraction means, color reproduction means, color reproduction condition calculation means and color reproduction execution means. Image processing section 22 is composed of a micro computer which at a minimum has a memory which stores program necessary for executing functions of the above-mentioned means and operation elements. In addition, it goes without saying that the color reproduction means and the color reproduction execution means are composed of exposure control section 25, all of the relevant mechanisms of the present apparatus and developing machines (not illustrated).

Embodiment 4

The present embodiment is a variation of embodiment 3. The present embodiment is the same as in embodiment 3 except for that step S17 and S18 are different from the embodiment 3. Hereinafter, step S17 and S18 will be explained.

First, in S17, based on the extracted neutral pixel, B, G and R cumulative density functions CDFB(B), CDFG(G) and CDFR (R) for the second neutral pixels are calculated.

In S18, by the use of the average density value ($B_{FM}$, $G_{FM}$ and $R_{FM}$) and cumulative density functions CDFB(B), CDFG(G) and CDFR (R) used in S17, the color correction amount is calculated. First, from the G color average density value $G_{FM}$ of a color negative film image on a frame of a color negative film, G color cumulative density function value CDFG ($G_{FM}$) is calculated. Then, from the calculated CDFG ($G_{FM}$), B color reverse cumulative density function value RCDFB (CDFG ($G_{FM}$)) is calculated. In addition, from the calculated CDFG ($G_{FM}$), R color reverse cumulative density function value RCDFR (CDFG ($G_{FM}$)) is calculated. Finally, the following equations are operated in that order for obtaining the color correction amounts ($\Delta B$, $\Delta G$ and $\Delta R$).

$\Delta B' = RCDFB(CDFG(G_{FM})) - B_{FM}$ $\Delta R' = RCDFR(CDFG(G_{FM})) - R_{FM}$ $\Delta B' = \Delta B' - (66\ B' + \Delta R')/3$ $\Delta G' = -(66\ B' + \Delta R')/3$ $\Delta R = \Delta R' - (66\ B' + \Delta R')/3$ Incidentally, the color correction amount may be used by lessening the saturation of the frame. Due to aforesaid color correction, printing having favorable color balance can be obtained.

Owing to the present invention, even when partiality of the color is excellent, pixels to be reproduced neutrally are appropriately extracted, and thereby favorable color correction conditions can be obtained. By the use of the color correction conditions obtained, favorable color correction in which the color of pixels to be reproduced neutrally are corrected neutrally can be conducted.

In addition, when the color original image is a color original digital image, the color of it is corrected from the color original digital image depending upon the color correction conditions corresponding to the density value of each neutral color. Therefore, even when the color correction conditions in which the color of pixels to be reproduced neutrally is corrected neutrally depending upon the density value of each neutral color, the color is corrected under favorable color balance from the high density value area up to low density value area of the color original digital image, not only the color of pixels to be reproduced neutrally can be corrected neutrally.

What is claimed is:

1. A method of calculating a color correcting condition for a color image composed of plural pixels, wherein a color of each pixel is separated into plural primary color density values, comprising steps of:

calculating a statistic for each primary color from the plural primary color density values of the plural pixels, wherein the statistic for each primary color indicates a relationship between a given primary color density value and a number of pixels showing the given primary color density value;

obtaining a specific density value corresponding to a predetermined statistic value in a low density value region in the calculated statistic for each primary color;

obtaining a specific density value corresponding to a predetermined statistic value in a high density value region in the calculated statistic for each primary color;

determining an extracting condition for each of the low density value region and the high density value region for each primary color based on the obtained specific density values;

extracting specific pixels in the low density value region and the high density value region from the plural pixels of the color image such that each primary color density value of the extracted specific pixels in the low density value region satisfies the extracting condition of the low density value region of the corresponding primary color, and such that each primary color density value of the extracted specific pixels in the high density value region satisfies the extracting condition of the high density value region of the corresponding primary color; and determining the color correcting condition for the color image based on the plural primary color density values of the extracted specific pixels.

2. The method of claim 1, wherein color correction is conducted for each pixel based on the color correcting condition.

3. The method of claim 1, wherein the plural pixels form a frame of a photographic film and an exposure condition to print an image of the frame onto a photographic paper is determined based on the color correcting condition.

4. The method of claim 1, further comprising:
   determining a second extracting condition for each primary color based on the plural primary color density values of the extracted specific pixels;
   extracting second specific pixels from the plural pixels of the color image, each primary color density value of the second specific pixels satisfying the second extracting condition of the corresponding primary color; and
   determining the color correcting condition based on the plural primary color density values of the extracted second specific pixels.

5. The method of claim 1, wherein the statistic comprises a cumulative density function of the number of pixels indicating a plurality of given primary color density values for each primary color.

6. The method of claim 1, wherein the specific pixels are neutral color pixels.

7. The method of claim 6, wherein the color correcting condition to make plural primary color density values of the neutral color pixels neutral is determined for each neutral density value.

8. The method of claim 7, wherein a neutral density value is obtained for each pixel from plural primary color density values of each pixel of the color image, and color correction is conducted for each pixel based on a color correcting condition corresponding to the neutral density value of each pixel.

9. The method of claim 1, wherein color correction is conducted for the color image based on the color correction condition so as to obtain a corrected color image.

10. The method of claim 9, wherein:
    the color image is a color digital image and a corrected color digital image is obtained;
    the steps of the method are conducted for the corrected color digital image so as to determine a second color correcting condition; and
    color correction is further conducted for the corrected color digital image.

11. A memory medium having computer readable program code means stored thereon for executing steps to calculate a color correcting condition for a color image, the steps comprising:
    calculating a statistic for each primary color from the plural primary color density values of the plural pixels, wherein the statistic for each primary color indicates a relationship between a given primary color density value and a number of pixels showing the given primary color density value;
    obtaining a specific density value corresponding to a predetermined statistic value in a low density value region in the calculated statistic for each primary color;
    obtaining a specific density value corresponding to a predetermined statistic value in a high density value region in the calculated statistic for each primary color;
    determining an extracting condition for each of the low density value region and the high density value region for each primary color based on the obtained specific density values;
    extracting specific pixels in the low density value region and the high density value region from the plural pixels of the color image such that each primary color density value of the extracted specific pixels in the low density value region satisfies the extracting condition of the low density value region of the corresponding primary color, and such that each primary color density value of the extracted specific pixels in the high density value region satisfies the extracting condition of the high density value region of the corresponding primary color; and
    determining the color correcting condition for the color image based on the plural primary color density values of the extracted specific pixels.

12. The method of claim 11, wherein the specific pixels are neutral color pixels.

* * * * *